W. H. TROUT.
GAGE MECHANISM.
APPLICATION FILED NOV. 4, 1916.
1,355,288.
Patented Oct. 12, 1920.
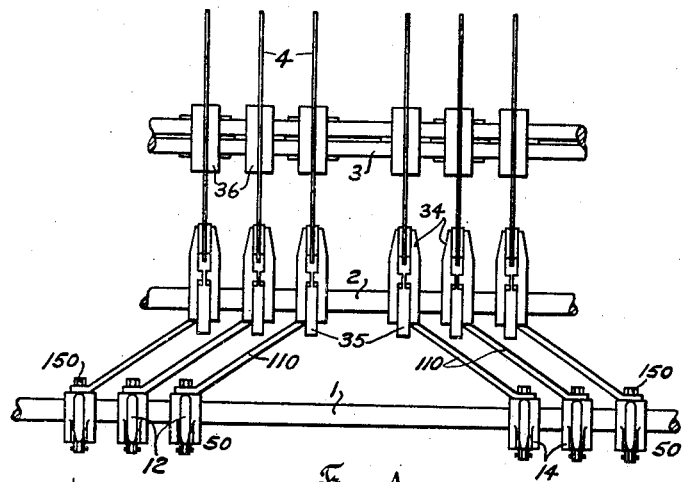
Fig. 1
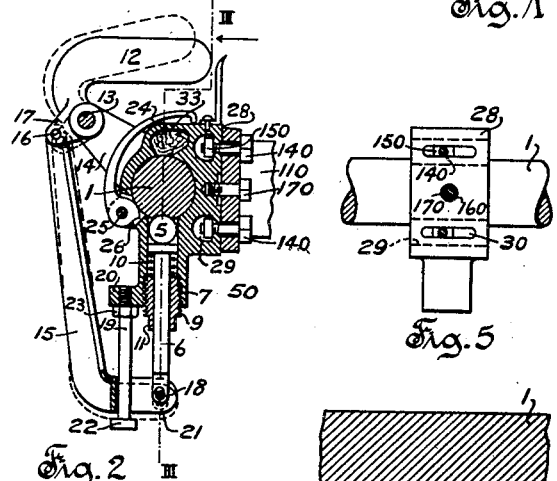
Fig. 2
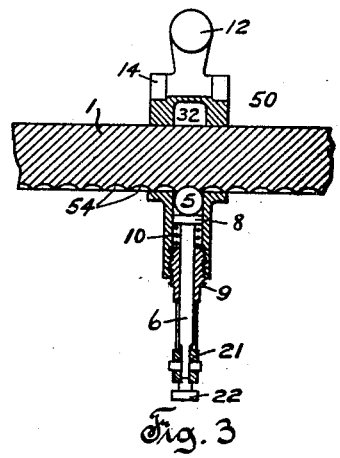
Fig. 5
Fig. 3
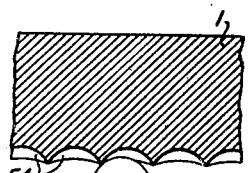
Fig. 7
Fig. 6
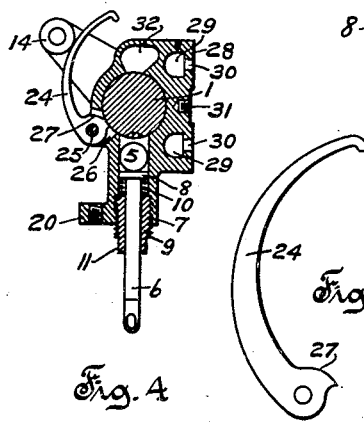
Fig. 4
Fig. 8
Inventor
W. H. Trout
by
Attorney

UNITED STATES PATENT OFFICE.

WILLIAM HENRY TROUT, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

GAGE MECHANISM.

1,355,288.  Specification of Letters Patent.  Patented Oct. 12, 1920.

Original application filed March 5, 1910, Serial No. 547,388. Divided and this application filed November 4, 1916. Serial No. 129,905.

*To all whom it may concern:*

Be it known that I, WILLIAM HENRY TROUT, a citizen of the United States, residing at Milwaukee, in the county of Milwaukee and State of Wisconsin, have invented a certain new and useful Improvement in Gage Mechanisms, of which the following is a specification.

This invention relates to improvements in the construction of machines used for trimming the edges of sawed lumber, commonly known in lumber-mills as the edger, and has specific relation to an inmprovement in gage mechanisms for properly setting the saws of edgers.

An object of the invention is to provide a gage mechanism especially applicable to edgers, which is simple in construction, efficient in operation, and readily manipulated. One of the more specific objects is to provide a gage mechanism which may be attached directly to the saw-guide carriers, this mechanism comprising a lock whereby the saw-guide carriers may be set predetermined distances apart, and having in addition a special clamping device for locking the carriers at fractional portions of such predetermined distances. Another object is to provide improved lubricating means for the gage mechanism. A further object is to provide a novel device for overcoming the difficulty produced by the width of the saw-kerf, which prevents the use of the fixed or predetermined spacings for both one-board and two-board cuttings on the ordinary edger as heretofore made.

The present application is a division of the application from which Patent No. 1,203,940 matured.

A clear conception of an embodiment of the invention may be had by referring to the drawing accompanying and forming a part of this specification in which like reference characters designate the same or similar parts in the various views.

Figure 1 is a fragmentary plan view of a six-saw edger, showing the saws, the guides and the gage mechanism, diagrammatically.

Fig. 2 is a vertical cross-section through the gage rod and one of the gage mechanisms for positioning the saws.

Fig. 3 is a transverse vertical section through a gage mechanism and a fragment of the gage rod, the section being taken along the line III—III of Fig. 2, looking in the direction of the arrow.

Fig. 4 is a vertical cross-section through the gage hub showing other details of the gage mechanism.

Fig. 5 is a rear view of the gage hub showing the same applied to a fragment of the gage rod.

Fig. 6 is a fragmentary bottom view of the gage rod.

Fig. 7 is an enlarged section through a fragment of the gage rod, showing the action of the ball-gage.

Fig. 8 is an enlarged side elevation of the special-set lock-bearing.

While the invention is disclosed as applied to a single edger, provided with six saws by way of illustration, it will be understood that the same principles may be applied to double edgers and to any number of saws, without departing from my invention.

The edger disclosed, see Fig. 1, comprises a longitudinal saw-shaft 3 mounted in suitable bearings not shown, and supporting a series of circular saws 4. The saws 4 are slidably mounted upon the shaft 3 by means of saw-collars 36. The saws are shiftable by means of saw-guides 34 supported upon saw-guide carriers 35 which are slidably mounted upon a longitudinal guide rod 2. The guide carriers 35 are themselves shifted and set in the desired positions by means of gage hubs 50 which slide upon a longitudinal gage rod 1, this rod being mounted in suitable bearings in the usual manner. The guide carriers 35 are connected with the gage hubs 50 by means of oblique bars 110.

Both the details of construction of the gage hubs 50 and the particular manner of securing them to the guide holders, which provide for the elimination of the saw-kerf and shrinkage as factors in sawing the lumber either into one or several boards, form important features of the present invention. The details of construction of the gage hub will be first described, reference being had to Figs. 2 to 8 inclusive of the drawing.

The gage hub 50, as before mentioned, slides upon the gage rod 1, this gage rod having in its lower surface a series of evenly spaced spherical recesses 54. The spacing of these recesses is preferably at even units of measurement plus the lumber shrinkage for that distance. For example, if the standard differences in width of lumber is taken as two inches, and the shrinkage is ⅜ inch per foot of width, then adjacent recesses 54 will be spaced $2\tfrac{1}{16}$ inches from center to center. A hardened steel ball 5 engages with these recesses, the ball being of substantially the same radius as the recesses so as to fit neatly therein, and the ball being kept pressed resiliently into the recess adjacent which it happens to be, by a reciprocating plunger 6 mounted in a socket formed in the lower extremity of the gage hub 50. The plunger 6 has an enlarged head 8 which is guided by the inner cylindrical surface of the socket 7, and is of substantially the same diameter as the ball 5. The body of the plunger 6 fits within the bore of a screw plug 9, the threads of which engage corresponding threads formed in the socket 7. A compression-spring 10 is inserted between the plug 9 and the plunger head 8 and keeps the adjacent ball 5 pressed resiliently into one of the recesses 54, as heretofore described. The plug 9 may be provided with a rectangular head 11 by means of which it may be adjusted to vary the pressure exerted by the spring 10.

While the above described mechanism is in a certain sense complete and the gage hub 50 can be shifted sidewise from notch to notch without providing special means for depressing the ball 5, the sidewise pressure sufficing to depress the ball enough to enable it to pass from one recess 54 to the next, it is preferable to provide means for positively depressing the ball. Such means as herein shown, comprises a shifting handle 12 pivoted upon a pin 13 carried upon supporting ears 14 on the gage hub 50; and a bent link 15, the upper end of which is pivotally mounted between a pair of ears 17 formed on the handle 12 by means of a pin 16, and the lower end of which is connected to the lower end of the plunger 6 by means of a pin 18. The lower end of the plunger 6 is slotted as shown, in order to permit the plunger 6 and the ball 5 to move independently of the bent link 15. By tilting the handle 12 into the position shown in dotted lines in Fig. 2, the link 15 is moved downwardly, carrying with it the plunger 6, the plunger being lowered a sufficient distance to permit the ball 5 to drop by gravity an amount almost equal to the depth of the adjacent recess 54. In order to permit adjustment of the extent of movement of the plunger 6 by the handle 12, a stop is provided, comprising a bolt 19 screwed into a lug 20, formed on the lower end of the gage hub 50. This bolt passes between the two arms 21 of the forked end of the link 15, and has an enlarged head 22 which acts as an abutment for the link 15, at the end of its downward movement. A lock-nut 23 is provided for the purpose of clamping the bolt 19 in an adjusted position. By adjustment of the bolt 19, the limit of movement of the plunger 6 may be made such that the ball 5 will just touch the dividing ridge between adjacent recesses 54, so that when the ball is moved past the successive division ridges, the plunger 6 will be alternately pressed downwardly by the ridges and moved upwardly by the spring 10, thereby giving a slight jar to the hand of the operator so that he notices the passing of the ball from notch to notch and has a conception of the distance moved.

In order to provide for those cases where boards of irregular or odd widths are to be cut, a special locking device is provided for securing the gage hub to any point of the gage shaft 1, irrespective of the positions of the recesses 54. This special lock comprises a clamp lever 24 which is pivoted on a pin 25 carried by the gage hub 50, the hub being cut away at this point so as to leave an open space 26 in which the clamping lever may operate. The clamping lever 24 is provided with an eccentric or cam surface 27, which, when the lever is pulled out to the position shown in Fig. 4, jams against a gage rod 1, and thereby holds the gage hub firmly in the position in which it is set. In its normal position, see Fig. 2, the end of the clamping lever 24 rests upon the top of the gage hub 50 and in this position the surface 27 is sufficiently retracted from the surface of the gage rod 1, to permit of free movement of the hub along the rod.

It will be seen from this description of the gage mechanism that shrinkage of the lumber has been provided for by forming the gage recesses 54 at distances apart sufficiently greater than the actual differences in width of seasoned lumber, to allow for shrinkage; that is, when the special lock is not in use, if $a$ denotes the shrinkage for the width $s$, the spacing of the recesses 54 is made equal to $a+s$ and distance from center to center of any two gage hubs on the gage-rod will be $n(a+s)$, where $n$ is any integral number, see Fig. 1.

It remains now to provide for the saw-kerf, which, so far as is known, has not yet been accomplished in the construction of edgers. If this is not done, every slab which is sawed into one board will produce a board short in width by the width of one saw-kerf; if sawed into two boards, each of the two boards produced will be short in width by the width of one saw kerf; if sawed into three boards, each of the three boards produced will be short in width by the width of one saw kerf, and so on. With the use of the present invention the influence of the saw-kerf is entirely eliminated, and no matter how many boards the slab may be sawed into, each board produced will be of proper width. This is accomplished as follows: Each gage hub 50 is connected with its respective guide-carrier 35 by an oblique extending bar 110, which is secured immovably to the guide carrier in any suitable manner, and which is to some extent adjustable relative to the gage hub 50 in the manner illustrated in Figs. 2 and 5. The inner face 28 of the gage hub 50, to which the bar 110 is secured, is provided with a pair of tubular recesses 29, which are connected with the face 28 by elongated slots 30, through which pass clamping bolts 140, the nuts 150 of which are disposed in the recesses 29. This arrangement of elements enables the gage hub 50 to be adjusted a short distance depending upon the width of kerf of the saws employed laterally with respect to its corresponding bar 110, and clamped into the adjusted position. The relative positions of any two adjusting guide carriers is such that when the distance from center to center of the two gage hubs 50 is a convenient number of lumber widths $n(a+s)$, the distance from center to center of the corresponding guide carriers is $n(a+s)+k$, where $k$ is the width of the saw-kerf, so that the actual width of the board sawed with the guide carriers in this position would be $n(a+s)$.

It will be understood, of course, that the width of the kerf differs to a slight extent with different saws and therefore the relative distances between the gage hubs 50 and the guide carriers 35 should be adjusted to the saw-kerf in each individual machine by shifting the bar 110 on the gage hub before tightening the bolts 140. When the correct adjustment has been made, the bolts 140 may be turned up tight and a hole 160, 31, bored and tapped in the bar 110 and gage hub 50, in which is inserted a cap screw 170, locking the elements in the adjusted position.

In order to secure lubrication during the sliding movement of the gage-hub, a lubricant chamber 32 is provided in the gage hub 50, in which oil-saturated waste 33 may be packed.

While I have hereinabove shown the most improved form of the invention, it should be understood that not all of the features are essential thereto or necessarily made in the exact form shown, but various changes and modifications in the construction as herein shown may be made without departing from the spirit of this invention and it is to be understood, therefore, that the invention is not otherwise limited than by the scope of the appended claims.

It is claimed and desired to secure by Letters Patent:—

1. In combination, an elongated element having a series of recesses therein, a hub slidable along said element, a ball located within said hub and adapted to enter said element recesses, means for urging said ball into an adjacent recess, a movable handle for sliding said hub along said element, and means connecting said handle and said ball urging means whereby movement of the former retracts the latter.

2. In combination, an elongated element having a plurality of recesses in its under side, a hub slidable longitudinally of said elements and forming a socket below said recesses, a locking member movable in said socket and adapted to enter said recesses, a plunger in said socket coacting with said member, means resiliently urging said plunger and said member upwardly toward said element recesses, and means for moving said hub along said element and for retracting said plunger during said movement.

3. In combination, an elongated element having a plurality of recesses in its under side, a hub slidable longitudinally of said element and forming a socket below said recesses, a locking member movable in said socket and adapted to enter said recesses, a plunger in said socket coacting with said member, means resiliently urging said plunger and said member upwardly toward said element recesses, and means for manually retracting said plunger and for sliding said hub along said element.

4. In combination, a rod having a plurality of equally spaced recesses in its under side, a hub slidable along said rod and forming a socket below said recesses, a locking member vertically movable in said socket below said member, a plunger engaging said member, spring means for urging said member toward said plunger and said recesses, and common means for retracting said plunger and for sliding said hub along said rod.

5. In combination, a rod having a series of equally spaced recesses each bounded by a spherical zone surface, a hub slidable along and parallel to said rod, a ball carried by said hub and adapted to enter and to have surface engagement with said recess surfaces, means for urging said ball into an adjacent recess, a pivoted handle for sliding said hub along said rod, and connecting means between said handle and said ball urging means whereby a pivotal movement of the former retracts the latter.

In testimony whereof I affix my signature.

WILLIAM HENRY TROUT.